US009538437B2

(12) United States Patent
Taori et al.

(10) Patent No.: US 9,538,437 B2
(45) Date of Patent: Jan. 3, 2017

(54) METHOD AND APPARATUS FOR PROVIDING SERVICE IN WIRELESS COMMUNICATION SYSTEM IN WHICH MULTIPLE BASE STATIONS COOPERATE WITH EACH OTHER, AND SYSTEM THEREFOR

(71) Applicant: Samsung Electronics Co., Ltd., Gyeonggi-do (KR)

(72) Inventors: Rakesh Taori, Gyeonggi-do (KR); Yeong-Moon Son, Gyeonggi-do (KR); Hyun-Jeong Kang, Seoul (KR); Ji-Yun Seol, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 13/769,093

(22) Filed: Feb. 15, 2013

(65) Prior Publication Data
US 2013/0208698 A1    Aug. 15, 2013

(30) Foreign Application Priority Data

Feb. 15, 2012    (KR) ........................ 10-2012-0015372

(51) Int. Cl.
*H04W 36/04* (2009.01)
*H04W 36/14* (2009.01)
*H04W 36/00* (2009.01)
*H04W 56/00* (2009.01)
*H04W 92/20* (2009.01)
(Continued)

(52) U.S. Cl.
CPC ......... *H04W 36/04* (2013.01); *H04W 36/0077* (2013.01); *H04W 36/14* (2013.01); *H04W 36/0055* (2013.01); *H04W 36/24* (2013.01); *H04W 56/0005* (2013.01); *H04W 84/20* (2013.01); *H04W 88/06* (2013.01); *H04W 88/10* (2013.01); *H04W 92/20* (2013.01)

(58) Field of Classification Search
CPC .. H04W 36/04; H04W 36/0055; H04W 36/24; H04W 84/20; H04W 36/14; H04W 88/06; H04W 92/20; H04W 88/10; H04W 36/0077; H04W 56/0005
USPC .......... 370/331, 201–213, 338; 455/450, 525
See application file for complete search history.

(56) References Cited

U.S. PATENT DOCUMENTS

2009/0104910 A1    4/2009    Lee et al.
2009/0163222 A1    6/2009    Schaepperle et al.
(Continued)

FOREIGN PATENT DOCUMENTS

EP    2393333 A1    12/2011

OTHER PUBLICATIONS

International Search Report dated May 31, 2013 in connection with International Patent Application No. PCT/KR2013/001216, 3 pages.
(Continued)

*Primary Examiner* — Jay Y Lee
*Assistant Examiner* — Jean F Voltaire

(57) ABSTRACT

Provided is a method for providing a service by a Base Station (BS) in a wireless communication system. The method includes setting up a radio link to a Mobile Station (MS) to provide the service; receiving BS information from at least one BS that cooperates to provide the service; and selecting an alternative BS for replacing the BS from among the at least one BS based on the BS information.

34 Claims, 7 Drawing Sheets

(51) Int. Cl.
*H04W 88/10* (2009.01)
*H04W 88/06* (2009.01)
*H04W 36/24* (2009.01)
*H04W 84/20* (2009.01)

(56) References Cited

U.S. PATENT DOCUMENTS

| | | | |
|---|---|---|---|
| 2009/0207855 A1* | 8/2009 | Watanabe | H04L 69/22 370/466 |
| 2009/0239570 A1* | 9/2009 | Koyanagi | H04W 36/0077 455/525 |
| 2011/0064048 A1* | 3/2011 | Oguchi | H04W 36/0055 370/331 |
| 2011/0222416 A1 | 9/2011 | Damnjanovic et al. | |
| 2011/0286433 A1* | 11/2011 | Xiao | H04L 5/0007 370/331 |
| 2012/0008596 A1* | 1/2012 | Jung | H04W 36/0033 370/331 |
| 2012/0014357 A1 | 1/2012 | Jung et al. | |
| 2012/0026972 A1* | 2/2012 | Miao | H04W 36/0072 370/331 |
| 2012/0188980 A1* | 7/2012 | Wang | H04W 36/0033 370/331 |

OTHER PUBLICATIONS

Written Opinion of the International Searching Authority dated May 31, 2013 in connection with International Patent Application No. PCT/KR2013/001216, 11 pages.

Extended European Patent Search dated Nov. 12, 2015 in connection with European Patent Application No. 13748969.6; 7 pages.

\* cited by examiner

METHOD AND APPARATUS FOR PROVIDING SERVICE IN WIRELESS COMMUNICATION SYSTEM IN WHICH MULTIPLE BASE STATIONS COOPERATE WITH EACH OTHER, AND SYSTEM THEREFOR

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Feb. 15, 2012 and assigned Serial No. 10-2012-0015372, the entire disclosure of which is incorporated herein by reference.

TECHNICAL FIELD OF THE INVENTION

The present disclosure relates to a method and apparatus for providing reliable services in a wireless communication system in which multiple base stations cooperate with each other, and a system therefor.

BACKGROUND OF THE INVENTION

Wireless communication systems have been developed into high-speed, high-quality wireless packet data communication systems to provide data services and multimedia services as well as the initial voice-oriented services. Recently, a variety of wireless communication standards, including not only 3GPP High Speed Downlink Packet Access (HSDPA) and High Speed Uplink Packet Access (HSUPA), and IEEE 802.16-based high-speed wireless communication systems, but also $4^{th}$ generation wireless communication systems such as Long Term Evolution (LTE) and Long Term Evolution-Advanced (LTE-A), have been developed to support high-speed, high-quality wireless packet data transmission services.

For the next-generation wireless communication systems, studies have been made of wireless communication systems that use high-frequency bands such as, for example, millimeter waves (mmWave) to support high-capacity data services. In the next-generation wireless communication systems using high-frequency bands, the possible communication distance between a Mobile Station (MS) and a Base Station (BS) is relatively short, which causes a decrease in cell radius of the BS, and an increase in the number of BSs installed to secure service areas of the MS. When the mobility of the MS is taken into consideration, the decrease in the cell radius of the BS and the increase in the number of BSs can lead to an increase in the number of inter-cell handovers by the MS, causing an increase in overhead of the system. Compared with the existing wireless communication systems, the next-generation wireless communication systems using high-frequency bands are highly likely to fail in setting up a radio link between an MS and a BS due to the movement of the MS and/or the obstacles around the MS. Therefore, there is a need for a scheme capable of providing more efficient services to users and improving reliability of the services taking into account the characteristics of the high-frequency bands to be used in the next-generation wireless communication systems.

SUMMARY OF THE INVENTION

To address the above-discussed deficiencies of the prior art, it is a primary object to provide a method and apparatus for improving reliability of services in a wireless communication system in which multiple BSs cooperate with each other, and a system therefor.

In certain embodiments of the present disclosure is to provide a method and apparatus for providing seamless services in a wireless communication system in which multiple BSs cooperate with each other, and a system therefor.

In certain embodiments of the present disclosure is to provide a method and apparatus for selecting an alternative BS replacing a master BS in a wireless communication system in which multiple BSs cooperate with each other, and a system therefor.

In certain embodiments of the present disclosure is to provide a service method and apparatus of a master BS and an alternative BS in a cloud cell-based wireless communication system, and a system therefor.

In accordance with certain embodiments, there is provided a method for providing a service by a Base Station (BS) in a wireless communication system. The method includes setting up a radio link to a Mobile Station (MS) to provide the service; receiving BS information from at least one BS that cooperates to provide the service; and selecting an alternative BS for replacing the BS from among the at least one BS based on the BS information.

In accordance with certain embodiments, there is provided a method for providing a service by a Base Station (BS) in a wireless communication system. The method includes transmitting BS information for selecting an alternative BS replacing a master BS, to the master BS that provides the service in cooperation with at least one BS; and receiving information indicating the selection of the alternative BS from the master BS, if the BS is selected as the alternative BS from among at least one BS that cooperates with the master BS.

In accordance with certain embodiments, there is provided a method for receiving a service by a Mobile Station (MS) in a wireless communication system. The method includes establishing a radio link for receiving the service, through a master Base Station (BS) that provides the service in cooperation with at least one BS; and receiving information about an alternative BS selected from the at least one BS to replace the master BS, from the master BS through which the radio link is established.

In accordance with certain embodiments, there is provided a Base Station (BS) for providing a service in a wireless communication system. The BS includes a transceiver for transmitting and receiving data to/from a Mobile Station (MS) in accordance with a predetermined communication scheme to provide the service; a communication interface for performing communication with at least one BS that cooperates to provide the service; and a controller for setting up a radio link to the MS, receiving BS information from the at least one BS, and selecting an alternative BS for replacing the BS from among the at least one BS based on the BS information.

In accordance with certain embodiments, there is provided a Base Station (BS) for providing a service in a wireless communication system. The BS includes a transceiver for transmitting and receiving data to/from a Mobile Station (MS) in accordance with a predetermined communication scheme to provide the service; a communication interface for performing communication with at least one BS that cooperates to provide the service; and a controller for transmitting BS information for selecting an alternative BS replacing a master BS, to the master BS that provides the service in cooperation with at least one BS, and controlling an operation of receiving information indicating the selection of the alternative BS from the master BS, if the BS is selected as the alternative BS from among at least one BS that cooperates with the master BS.

In accordance with certain embodiments, there is provided a Mobile Station (MS) for receiving a service in a wireless communication system. The MS includes a transceiver for transmitting and receiving data in accordance with a predetermined communication scheme; and a controller for establishing a radio link for receiving the service, through a master Base Station (BS) that provides the service in cooperation with at least one BS, and controlling an operation of receiving information about an alternative BS selected from the at least one BS to replace the master BS, from the master BS through which the radio link is established.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

Figure 1:
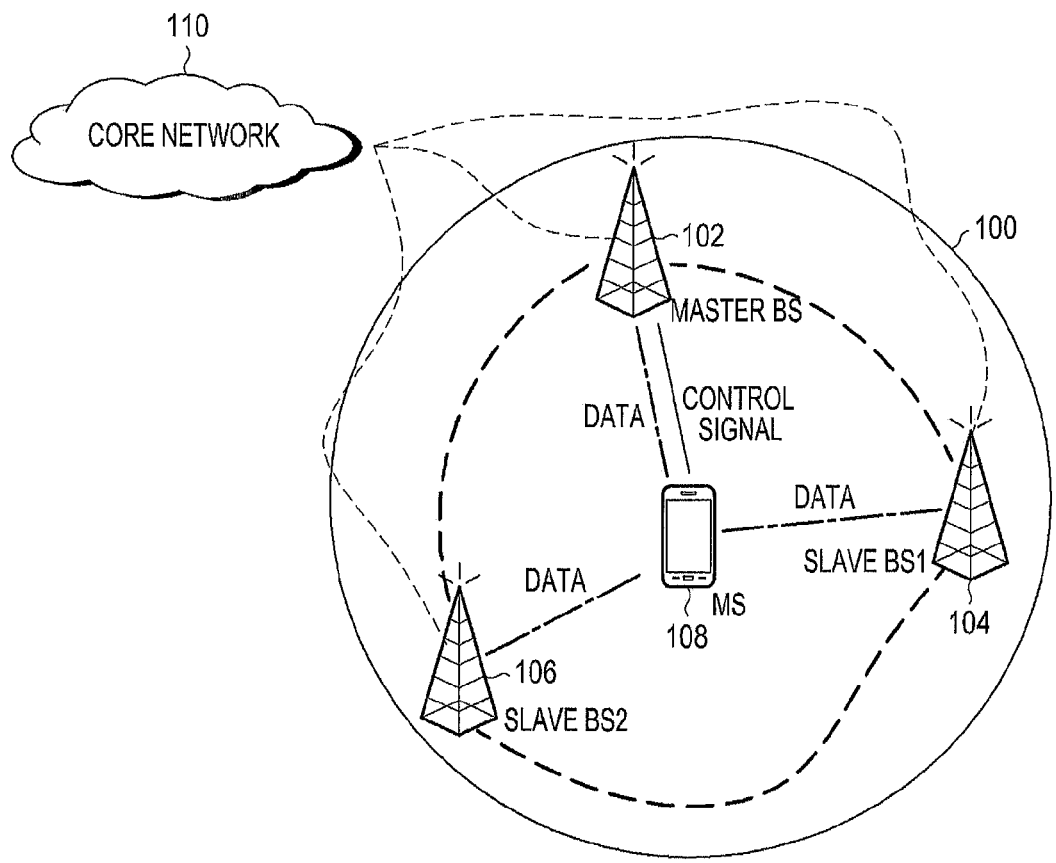
FIG. 1 illustrates a configuration of a cloud cell in a wireless communication system according to embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Preferred embodiments of the present disclosure will now be described in detail with reference to the accompanying drawings. In the following description, specific details such as detailed configuration and components are merely provided to assist the overall understanding of exemplary embodiments of the present disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Exemplary embodiments of the present disclosure provide a fall-back communication service method such as a method of selecting an alternative BS replacing a master BS operating as a serving BS of an MS to improve reliability of services in a wireless communication system in which multiple BSs cooperate with each other.

Although embodiments of the present disclosure will be described below with reference to a cloud cell-based wireless communication system defined herein, the embodiments may be applied in the same way not only to the existing wireless communication systems where multiple BSs cooperate with each other, but also to Peer to Peer (P2P) communication and Device to Device (D2D) communication.

Embodiments of the present disclosure provide a cloud cell-based wireless communication system for providing more efficient services to users using high-frequency bands such as mmWave in a wireless communication system that provides services to MSs by multiple BSs in cooperation with each other. In certain embodiments, the cloud cell may be construed as a virtual cell that includes an MS and multiple BSs (hereinafter referred to as 'member BSs') providing services to the MS, and the cloud cell operates in the mmWave bands.

In certain embodiments, it will be assumed that for the cloud cell, an MS communicates with a BS in a beamformed system that transmits/receives data by beamforming. A BS that the MS has initially accessed operates as a master BS of the cloud cell that is virtually configured to provide services to the MS.

The master BS can be one of the member BSs, and controls operations of other member BSs in the cloud cell. Other member BSs obtained by excluding the master BS from the member BSs operate as slave BSs. The member BSs each can belong to one or more cloud cells. Therefore, a master BS belonging to a certain cloud cell can be a master BS or a slave BS belonging to at least one other cloud cell. Similarly, a slave BS belonging to a certain cloud cell can be a master BS or a slave BS belonging to at least one other cloud cell. For their communication, member BSs in a cloud cell can be physically connected to each other in a wire or wireless manner.

FIG. 1 illustrates a configuration of a cloud cell in a wireless communication system according to embodiments of the present disclosure.

Referring to FIG. 1, a cloud cell 100 includes an MS 108, and, for example, three member BSs 102, 104 and 106 capable of transmitting data to the MS 108. The number of member BSs constituting the cloud cell 100 is assumed to be three (3) for convenience of description, and the number of member BSs is subject to change. The master BS 102 can transmit both control signals and data to the MS 108, and controls operations of the first and second slave BSs 104 and 106. The first and second slave BSs 104 and 106 can transmit only data to the MS 108 without transmitting control signals, unless they receive special instructions from the master BS 102. However, the first and second slave BSs 104 and 106 can also transmit control information the MS 108 according to the instructions of the master BS 102. The data that the master BS 102 and each of the first and second slave BSs 104 and 106 transmit to the MS 108 can be the same or different data.

The master BS 102 and the first and second slave BSs 104 and 106 are directly connected to a core network 110, and can be connected to each other in a wire or wireless manner for their communication. In accordance with an embodiment of the present disclosure, the master BS 102 and the first and second slave BSs 104 and 106 can increase reliability of a radio link having a low signal strength in a high-frequency band by serving the MS 108, and can increase data throughput by providing at least one radio link with improved quality to the MS 108. The cloud cell 100 is configured for the purpose of providing high-speed data services to the MS 108, and it will be apparent to those of ordinary skill in the art that the cloud cell can be configured even though the MS 108 is not located on the edge of the cell.

In the cloud cell 100, the master BS 102 and the first and second slave BSs 104 and 106 can transmit data to the MS 108 at the same time, or at different times (or with the time difference). However, it is not always that two or more member BSs perform data transmission in the cloud cell 100. The MS 108 can transmit data to the master BS 102 and the first and second slave BSs 104 and 106 at the same time, or at different times. In this case, the MS 108 can have multiple Radio Frequency (RF) chains for communicating with multiple BSs. However, the MS 108 does not necessarily require multiple RF chains, and if having one RF chain, the MS 108 can exchange data with the BSs 102, 104 and 106 at different times. In certain embodiments, the cloud cell 100 can be reconfigured depending on the communication state between the MS 108 and the BSs 102, 104 and 106, and a BS(s), which continuously undergoes delay during communication with the MS 108, can be excluded from the cloud cell 100.

In the cloud cell 100 having the above configuration, a scheme is required that minimizes the impact of Radio Link Fail (RLF) between the master BS 102 and the MS 108.

In the existing wireless communication system, if RLF occurs between an MS and a BS, fast handover is performed. In this case, very frequent measurements occur for the fast handover, causing high-speed backhaul in the system.

An embodiment of the present disclosure proposes a Fast Switching Mechanism (FSM) for switching a radio link to an alternative BS replacing a master BS, if RLF occurs between an MS and the master BS in a cloud cell. The alternative BS in the cloud cell will be referred to as an Alternative Cloud Master (ACM).

In the present disclosure, the ACM is defined as a member BS that controls the cloud cell, replacing the master BS, if RLF occurs between an MS and the master BS in the cloud cell. The ACM is pre-designated by the master BS, and the master BS transmits information about the designated ACM to the MS and other member BSs of the cloud cell. If the ACM pre-designated by the master BS is set to replace the master BS upon occurrence of RLF, a radio link between the MS and the pre-designated ACM can be connected even though a radio link between the MS and the master BS is not connected, making it possible to prevent an increase in overhead of the system due to fast handover like in the existing wireless communication system.

The ACM does not necessarily need to be designated, and can be designated in various different ways depending on the communication system to which it is applied, the scenario where the communication service is provided, and/or the channel state.

The ACM proposed by an embodiment of the present disclosure is for a fall-back service for providing reliable communication services to the MS in the wireless communication system, and the master BS allocates a ranging opportunity to the MS so that the MS can perform periodic or aperiodic ranging with the pre-designated ACM. The ranging refers to a synchronization procedure between the MS and the BS, and can correspond to, for example, the ranging procedure in the IEEE 802.16-based wireless communication service or the synchronization procedure between an MS and a BS, which is used in various wireless communication systems.

The method (or a method of pre-allocating a transmission opportunity to an ACM) of pre-allocating a ranging opportunity to an MS for synchronization with a selected (or designated) ACM according to an embodiment of the present disclosure can be applied not only to the cloud cell, but also the typical network including a BS and an MS, and the D2D (or P2P) communication.

If the proposed method of pre-allocating a ranging opportunity is applied to the typical network, the network can allocate to an MS an opportunity for ranging with a pre-designated alternative BS in addition to a serving BS, or can allocate an opportunity so that the MS can transmit data to the alternative BS. If the method of pre-allocating a ranging opportunity is applied to the D2D communication, a device (for example, supervisor, group owner, or leader device) serving as a manager among a plurality of devices using D2D communication can grant an opportunity so that its opponent device in communication can transmit data to another device, which is pre-designated to replace the function of the manager.

In the method of pre-allocating a ranging opportunity, an MS can request an ACM to replace the function of a master BS in response to the allocated ranging opportunity, or can transmit code information indicating that the replacement operation is not necessary because its radio link to the existing master BS has an excellent state. The code information can be implemented with a single code.

For convenience of description, in an embodiment of the present disclosure, if it indicates that an MS requests an ACM to replace the function of a master BS, the code information will be defined as a Fast Master Switch (FMS)

code, and if it indicates that the replacement operation is not necessary because its radio link to the existing master BS has an excellent state, the code information will be defined as an OK code. The code information can use a code having a distance sufficient to indicate the FMS code and the OK code.

As described above, the method of indicating whether the function replacement to a master BS is required or not by transmitting code information to an ACM by an MS can be applied not only to the cloud cell, but also to the typical network including a BS and an MS, and the D2D communication.

Reference will now be made to FIGS. 2 to 5 to describe the ACM selection, the ranging procedure and the FMS procedure according to an embodiment of the present disclosure. For convenience of description, it will be assumed that examples of FIGS. 2 to 5 are performed in the cloud cell of FIG. 1.

Figure 2:
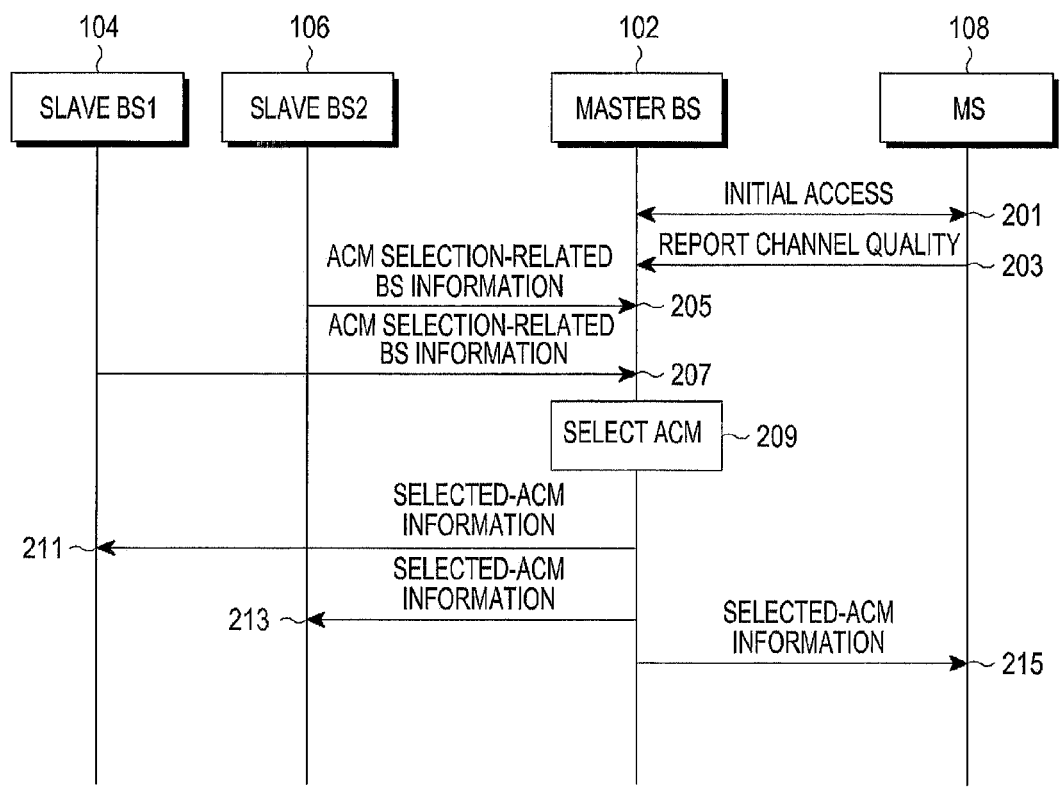
FIG. 2 illustrates a procedure for selecting an ACM by a master BS in a wireless communication system according to embodiments of the present disclosure.

FIG. 2 illustrates a procedure for selecting an ACM by a master BS in a wireless communication system according to an embodiment of the present disclosure.

Referring to FIG. 2, in step 201, an MS 108 performs an initial access procedure with a master BS 102 to set up a radio link between the master BS 102 and the MS 108. Thereafter, in step 203, the MS 108 measures the channel quality of the radio link periodically or aperiodically, and reports the measured channel quality to the master BS 102. In steps 205 and 207, first and second slave BSs 104 and 106 transmit ACM selection-related BS information to the master BS 102. The ACM selection-related BS information, information for ACM selection, includes at least one of identification information, location information, load information and capability information of the slave BS.

In step 209, the master BS 102 selects an ACM capable of providing the better radio link quality to the MS 108 from among the first and second slave BSs 104 and 106, using at least one of the channel quality information received from the MS 108 and the ACM selection-related BS information received from the first and second slave BSs 104 and 106. The radio link of the MS 108 can vary in its state depending not only on the channel state, but also on the location, load, or capability of the current master BS. In steps 205 and 207, the ACM selection-related BS information can be transmitted upon a transmission request from the master BS 102, or can be transmitted periodically or aperiodically even though there is no request from the master BS 102.

Also, in step 209, the ACM selection can be performed once during initial access by the MS 108, can be performed at predetermined intervals, or can be performed if the quality of the radio link is lower than a predetermined threshold.

Thereafter, in steps 211 to 215, the master BS 102 transmits information about the selected ACM to the first and second slave BSs 104 and 106 and signals information about the selected ACM to the MS 108, using a front haul or back haul scheme. Based on the received ACM information, the first and second slave BSs 104 and 106 and the MS 108 each can determine which BS is selected as an ACM replacing the master BS 102, upon occurrence of RLF. Although not illustrated, upon receiving the ACM information in steps 211 to 215, the first and second slave BSs 104 and 106 and the MS 108 can send a confirmation message to the master BS 102 in response thereto.

In the example of FIG. 2, if the ACM selection-related BS information includes location information of the BS, the maximum path diversity can be provided in high-frequency band communications such as mmWave communication. In certain embodiments, a BS selected as an ACM in one cloud cell can be selected as an ACM in another cloud cell. Although one ACM is selected in this example, multiple ACMs can also be selected depending on the communication environment.

Figure 3:
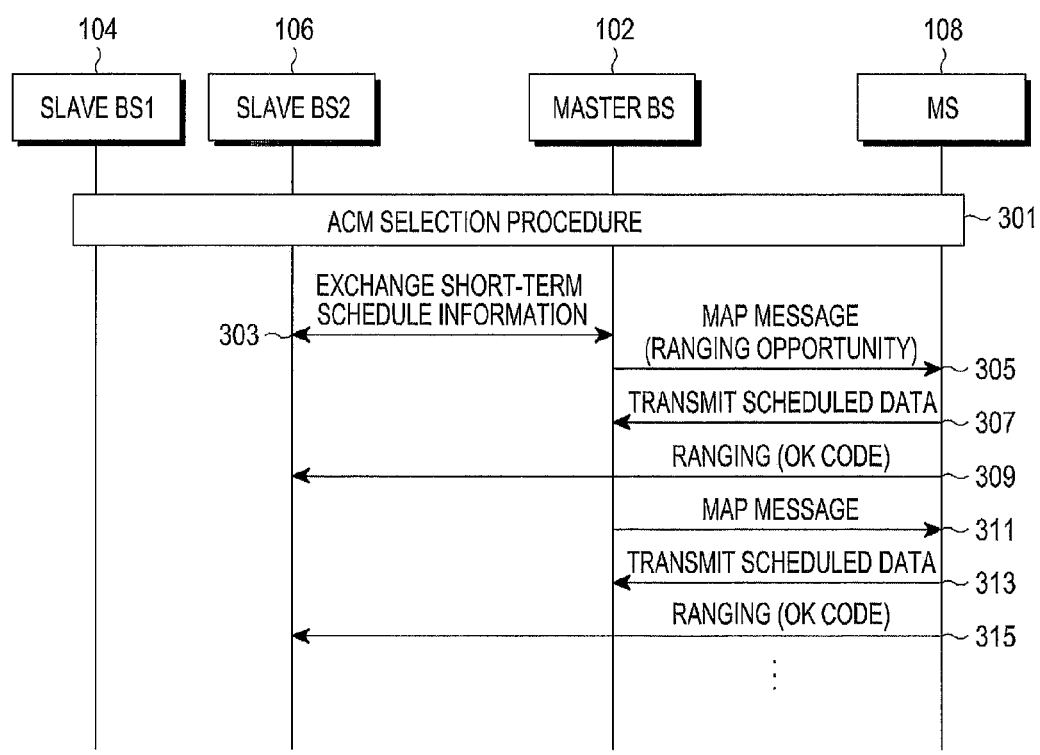
FIG. 3 illustrates a ranging procedure for synchronization between an MS and an ACM in a wireless communication system according to embodiments of the present disclosure.

FIG. 3 illustrates a ranging procedure for synchronization between an MS and an ACM in a wireless communication system according to an embodiment of the present disclosure.

Referring to FIG. 3, an ACM selection procedure is performed in step 301, and its detailed description will be omitted since it is the same as the procedure in FIG. 2. For convenience, it will be assumed that a second slave BS 106 has been selected as an ACM in the ACM selection procedure of step 301. Thereafter, in step 303, a master BS 102 exchanges short-term schedule information with the second slave BS 106 so that an MS 108 can perform its ranging with the second slave BS 106 selected as an ACM depending on the set schedule (for example, at predetermined intervals or time intervals). Then, the second slave BS 106 selected as an ACM schedules the time it will receive a ranging opportunity allocated by the master BS 102.

In step 305, the master BS 102 transmits ranging opportunity allocation information with a MAP message (or control message) informing the MS 108 of its resource allocation results. Although the MAP message (or control message) is located in the front part of a frame (or subframe), it also can be located in another part thereof.

Figure 4:
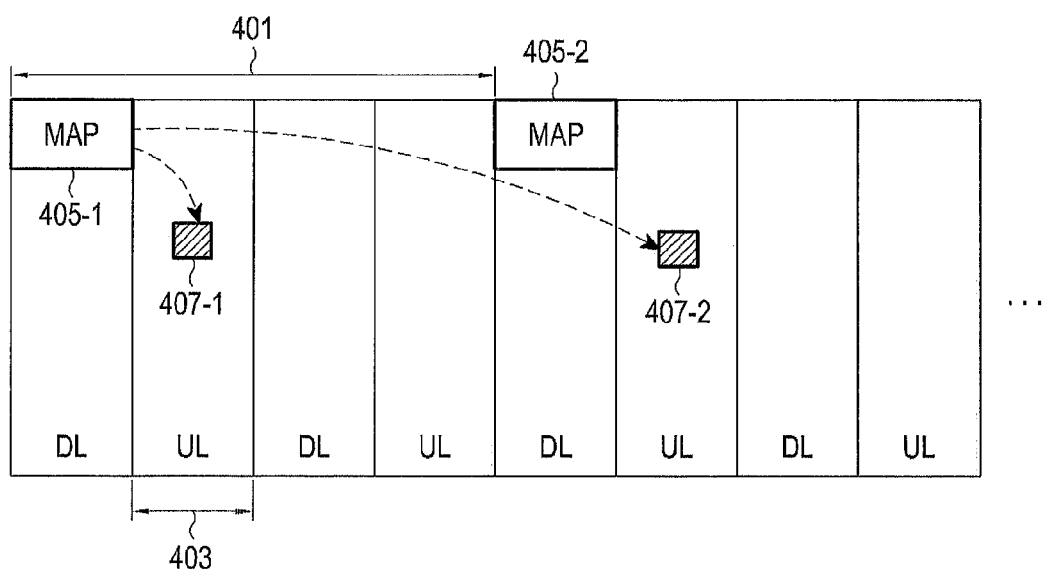
FIG. 4 illustrates a frame structure for delivering ranging opportunities according to embodiments of the present disclosure.

FIG. 4 briefly illustrates a frame structure for delivering ranging opportunity allocation information according to an embodiment of the present disclosure. However, it should be noted that the ranging opportunity allocation information is not necessarily transmitted with the frame structure of FIG. 4. For example, the ranging opportunity allocation information can be transmitted to the MS 108 over a downlink control channel, or can be transmitted by separate signaling.

In FIG. 4, reference numeral 401 represents a frame (or subframe) where a downlink transmission interval DL and an uplink transmission interval UL are repeated alternately, and reference numeral 403 represents a subframe (or slot) in an uplink transmission interval UL. It will be assumed that if reference numeral 401 represents a frame, reference numeral 403 represents a subframe, and if reference numeral 401 represents a subframe, reference numeral 403 represents a slot. In an embodiment of the present disclosure, the ranging opportunity allocation information can be transmitted with, for example, a MAP message 405-1 located in the front part of the frame (or subframe) 401 that is first transmitted to the MS 108 after the ACM selection procedure is performed, or that is designated for ranging.

The ranging opportunity allocation information, as shown by dotted lines in FIG. 4, indicates resources (subframes or slots 407-1, 407-2, . . . ) allocated for ranging in the uplink transmission interval 403, and the MS 108 performs ranging for synchronization with the ACM using the allocated resources. The ranging opportunities can be allocated as dedicated resources or can be allocated on a contention basis. As another example, the ranging opportunity allocation information can individually indicate the resources which are allocated for ranging in a frame (or subframe) whenever a MAP message (or control message) is transmitted. The ranging opportunities can be allocated using the MAP message which is exclusively allocated as in the above example, or can be allocated with piggyback information during general resource allocation.

Turning back to FIG. 3, the MAP message (or control message) of step 305 includes general resource allocation information in addition to the ranging opportunity allocation information. In step 307, the MS 108 performs scheduled uplink data transmission by checking the resource allocation information received in step 305. In step 309, the MS 108 sends a ranging message for synchronization with the second slave BS 106 selected as an ACM.

The ranging message includes code information indicating that the MS 108 periodically or aperiodically requests the second slave BS 106 to replace the function of the master BS 102, or indicating that the MS 108 does not need to switch the master BS 102 since the radio link quality between the master BS 102 and the MS 108 is excellent. In the example of FIG. 3, it will be assumed that the radio link quality between the MS 108 and the master BS 102 is excellent. In this case, as in the example of FIG. 3, the MS 108 sends a ranging message including the OK code to the second slave BS 106, and upon detecting the OK code, the second slave BS 106 recognizes that the current radio link state of the MS 108 does not need to switch the master BS 102.

Upon receiving the OK code from the MS 108 using the ranging message, the ACM can inform the master BS 102 of the received OK code. Then, the master BS 102 may recognize that the radio link to the MS 108 is excellent. In this embodiment, upon receiving the OK code from the MS 108, the second slave BS 106 can inform the master BS 102 of the directions (hereinafter referred to as best beam information) of the best transmit beam of the MS 108 and the best receive beam of the ACM in the uplink. The direction of the best transmit beam and the best receive beam refers to the direction of the beam having the highest signal strength, or having a signal strength higher than or equal to a predetermined threshold. Then, the master BS 102 transmits the best beam information to the MS 108, and thereafter, if RLF with the master BS 102 occurs, the MS 108 can receive a seamless service through the second slave BS 106 using the received best beam information. The best beam information can be transmitted to the MS 108 along with the data by piggybacking, or by separate signaling. In this embodiment, the master BS and the ACM can be synchronized with respect to context information of the MS, for seamless service delivery.

In step 311, the master BS 102 sends back a MAP message (or control message) for general resource allocation. Since the ranging opportunity allocation information was transmitted in step 305, the MAP message (or control message) does not include the ranging opportunity allocation information in strep 311. Thereafter, in steps 313 and 315, the MS 108 transmits scheduled uplink data and performs ranging. Steps 313 and 315 are the same as steps 307 and 309 in terms of the operation.

In the example of FIG. 3, the master BS transmits ranging opportunity allocation information to the MS with a single transmission of a MAP message, making it possible to reduce the signaling load needed for synchronization between the MS and the ACM. The MS performs synchronization with the ACM selected through the ranging procedure, and does not need to maintain the uplink synchronization with all member BSs in the cloud cell.

Figure 5:
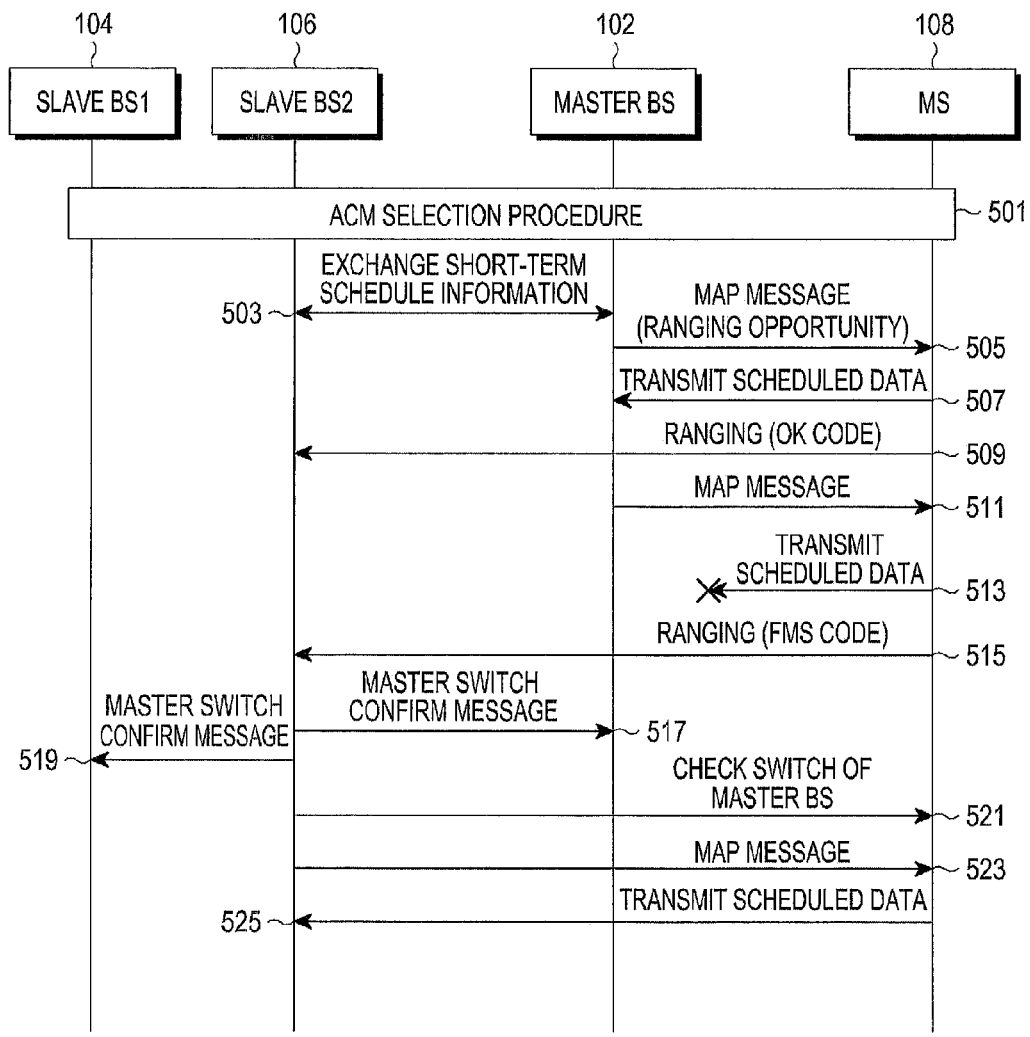
FIG. 5 illustrates an FMS procedure for switching a master BS in a wireless communication system according to embodiments of the present disclosure.

FIG. 5 illustrates an FMS procedure for switching a master BS in a wireless communication system according to an embodiment of the present disclosure.

Referring to FIG. 5, steps 501 to 509, in which the master BS 102 selects an ACM and allocates a ranging opportunity to the MS 108 with a MAP message and the MS 108 performs ranging with the ACM, are the same in operation as steps 301 to 309 in FIG. 3, so a detailed description thereof will be omitted.

Thereafter, in step 511, the master BS 102 sends a MAP message for general resource allocation, and it will be assumed that the scheduled uplink data transmission by the MS 108 is not normally performed in step 513 due to the failure in a radio link between the master BS 102 and the MS 108. Upon detecting RLF with the master BS 102, the MS 108 transmits the FMS code for requesting an operation of replacing the function of the master BS with a ranging message that is sent to the second slave BS 106 which is an ACM, in step 515.

Upon receiving the ranging message including the FMS code, the second slave BS 106 recognizes RLF between the MS 108 and the master BS 102, and sends a master switch confirm message in steps 517 to 521 to inform the other member BSs 102 and 104 and the MS 108 that the second slave BS 106 will temporarily or permanently operate as a new master BS, replacing the previous master BS 102 in the cloud cell 100. As another example, upon receiving the ranging message including the FMS code, the second slave BS 106 can operate as a new master BS after determining whether to do so, with the permission from the existing master BS 102.

In this embodiment, the second slave BS 106 can temporarily perform the function of the master BS for a predetermined period, or can permanently perform the function of the master BS. For example, when temporarily performing the function of the master BS, the second slave BS 106 can transmit a temporary code indicating it with a master switch confirm message. In this case, the second slave BS 106 allocates a ranging opportunity for the existing master BS 102 to the MS 108, and determines whether the failed radio link between the MS 108 and the existing master BS 102 is normally recovered within a predetermined number of attempts. If the failed radio link is normally recovered within the predetermined number of attempts, the second slave BS 106 plays again a role of the slave BS, returning the function of the master BS to the existing master BS 102. However, if the failed radio link is not normally recorded within the predetermined number of attempts, the second slave BS 106 permanently performs the function of the master BS.

If the second slave BS 106 needs to permanently perform the function of the master BS under the instruction of the master BS 102, or due to other reasons such as communication environments, the second slave BS 106 can be a master switch code indicating it with the master switch confirm message.

The embodiment using the temporary code and the master switch code is optional.

Although not shown, upon receiving the master switch confirm message in steps 517 to 521, the other member BSs 102 and 104 and the MS 108 can send a confirmation message to the second slave BS 106 operating as a new master BS in response thereto.

Thereafter, the new master BS 106 sends a MAP message for general resource allocation to the MS 108 in step 523, and the MS 108 performs scheduled uplink data transmission using the allocated resources in step 525. Although not shown, the new master BS 106 can select again an ACM through the above procedures, and if RLF between the new master BS 106 and the MS 108 occurs, the procedure of FIG. 5 can be performed so that the selected ACM can operate as a new master BS.

Figure 6:
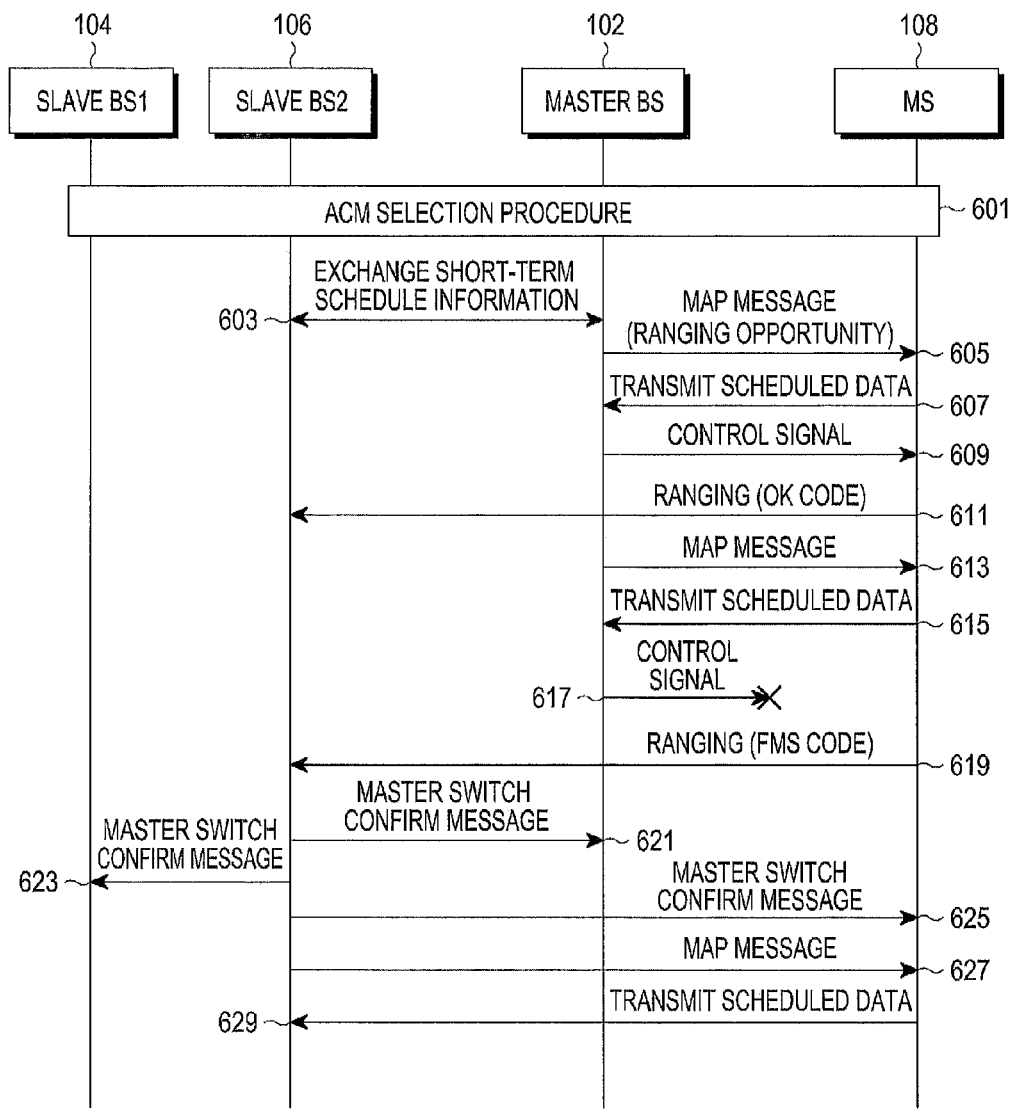
FIG. 6 illustrates an FMS procedure for switching a master BS in a wireless communication system according to embodiments of the present disclosure.

FIG. 6 illustrates an FMS procedure for switching a master BS in a wireless communication system according to another embodiment of the present disclosure.

Referring to FIG. 6, steps 607 to 607 and 611, in which the master BS 102 selects an ACM and allocates a ranging opportunity to the MS 108 with a MAP message and the MS 108 performs ranging with the ACM, are the same in operation as steps 301 to 309 in FIG. 3, so a detailed description thereof will be omitted.

In the example of FIG. 6, after receiving a MAP message from the master BS 102 in step 605, the MS 108 receives a control signal transmitted from the master BS 102 in step 609, for synchronization maintenance and best beam maintenance with the master BS 102. The control signal can be a sync channel signal for synchronization maintenance, a reference signal for best beam maintenance, or various control signals that the master BS 102 transmits to the MS 108. If both its scheduled uplink data transmission in step 607 and control signal reception in step 609 are normally performed, the MS 108 sends a ranging message including an OK code to the second slave MS 106 in step 611, and upon receiving the OK code, the second slave BS 106 recognizes that the current radio link state of the MS 108 does not need to switch the master BS.

Thereafter, in step 613, the master BS 102 sends a MAP message for general resource allocation to the MS 108. It will be assumed that even though the MS 108 has normally performed scheduled uplink data transmission in step 615, the control signal transmitted from the master BS 102 has not been normally received in step 617. Upon detecting RLF due to the failure to receive the control signal, the MS 108 transmits the FMS code for requiring an operation of replacing the function of the master BS to the second slave BS 106, which is an ACM, using a ranging message in step 619. Subsequent steps 621 to 629, in which the master BS is switched and the data transmission between the new master BS 106 and the MS 108 is performed, are the same in operation as steps 517 to 525 in FIG. 5, so a detailed description thereof will be omitted.

The embodiment of FIG. 6 is merely illustrative. The transmission by the master BS 102 should not necessarily be performed after uplink data transmission by the MS 108, and the MS 108 can receive a control signal from the master BS 102 even though the transmission by the master BS 102 is performed before or without the uplink data transmission. Therefore, in an embodiment of the present disclosure, the MS 108 can send a ranging message including an FMS code to the second slave BS 106 selected as an ACM, if at least one of uplink data transmission fail or control signal reception fail occurs.

Figure 7:
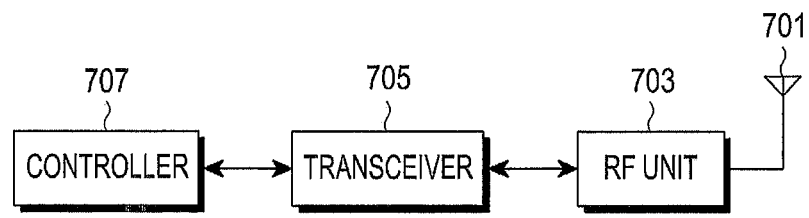
FIG. 7 schematically illustrates a structure of an MS in a wireless communication system according to embodiments of the present disclosure.

FIG. 7 schematically illustrates a structure of an MS in a wireless communication system according to an embodiment of the present disclosure. The MS in FIG. 7 includes an antenna 701, an RF unit 703, a transceiver 705, and a controller 707.

Although one antenna 701 is shown for convenience of description, the MS can have one or multiple antennas, and the RF unit 703 can include one or multiple RF chains (not shown) as described above. The transceiver 705 includes a transmitting module and a receiving module for transmitting and receiving data to/from a BS depending on the communication scheme determined in the wireless communication system. The controller 707 accesses the master BS 102 and reports the channel quality thereto in accordance with the procedure described in FIG. 2. The controller 707 receives selected-ACM information from the master BS 102 through the transceiver 705, and analyzes the received information. Upon receiving a message (for example, a MAP message) for resource allocation from the master BS 102 in accordance with the procedure of FIG. 3, the controller 707 checks ranging opportunity allocation information included in the MAP message (or a control message).

The controller 707 transmits uplink data to the master BS 102 through the MAP message using scheduled resources, and controls to periodically or aperiodically send a ranging message for synchronization to an ACM in a subframe (or a slot) designated by the ranging opportunity allocation information. If the radio link state between the MS 108 and the master BS 102 is excellent (for example, if the channel quality is greater than or equal to a predetermined threshold), the controller 707 controls to transmit the OK code with the ranging message, and if RLF occurs due to the data transmission fail or the control signal reception fail between the MS 108 and the master BS 102 like in the procedure of FIG. 5 or 6, the controller 707 controls to transmit the FMS code with the ranging message.

After sending the ranging message including the FMS code to the master BS 102, the controller 707 recognizes that the ACM operates as a new master BS, upon receiving a master switch confirm message from the ACM. Thereafter, the controller 707 is allocated resources by receiving a MAP message sent by the ACM, and performs uplink data transmission using the allocated resources.

Figure 8:
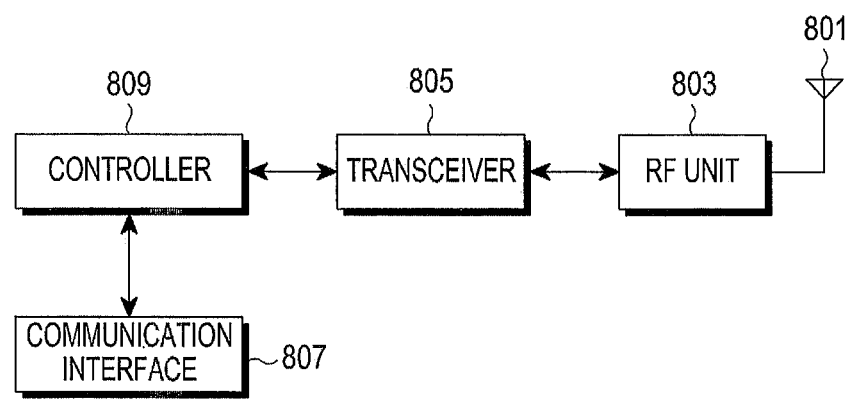
FIG. 8 schematically illustrates a structure of a BS in a wireless communication system according to embodiments of the present disclosure.

FIG. 8 schematically illustrates a structure of a BS in a wireless communication system according to an embodiment of the present disclosure. The above-described master BS and slave BS can be implemented in the structure of FIG. 8.

Referring to FIG. 8, the BS includes an antenna 801, an RF unit 803, a transceiver 805, a communication interface 807, and a controller 809. Although one antenna 801 is shown in FIG. 8 for convenience of description, the BS in FIG. 8 can have one or multiple antennas, and the RF unit 803 can include one or multiple RF chains (not shown). The transceiver 805 includes a transmitting module and a receiving module for transmitting and receiving data to/from an MS depending on the communication scheme determined in the wireless communication system. The communication interface 807 performs wired/wireless communication with other member BSs in the cloud cell 100, and includes an interface for communication with the core network 110.

If the BS in FIG. 8 is a master BS, the controller 809 receives a channel quality report from the MS 108 like in the ACM selection procedure of FIG. 2, and receives ACM selection-related information from the slave BSs 104 and 106 in the cloud cell 100.

The controller 809 selects an ACM using the channel quality report and the ACM selection-related information, and transmits the selected-ACM information to the MS 108 and the slave BSs 104 and 106. In addition, the controller 809 transmits ranging opportunity allocation information to the MS 108 with a message (for example, a MAP message) for resource allocation like in the ranging procedure of FIG. 3. The ranging opportunity allocation information can be transmitted once using a predetermined MAP message (or control message), contributing to a reduction in signaling load.

If RLF with the MS 108 occurs, the controller 809 determines that the ACM operates as a new master BS, by receiving a master switch confirm message set from the ACM like in the FMS procedure of FIG. 5. As in the foregoing embodiment, the master switch confirm message can include a temporary code and a master switch code. If the temporary code is included, the controller 809 determines that the ACM temporarily performs the function of the master BS. If the master switch code is included, the controller 809 determines that the ACM permanently performs the function of the master BS.

If the BS in FIG. 8 is an ACM selected from among slave BSs, the controller 809 receives ACM selection-related information indicating that the slave BS is selected as an ACM, from the master BS 102 like in the ACM selection procedure of FIG. 2. The controller 809 exchanges, with the master BS 102, schedule information for scheduling ranging opportunities that the master BS 102 will allocate to the MS 108. Thereafter, the controller 809 receives a ranging message that is sent from the MS 108 depending on the ranging opportunity allocated to the MS 108.

If a ranging message including the OK code is received from the MS 108, the controller 809 can inform the master BS 102 of its reception of the OK code, and provide, to the master BS 102, best beam information indicating the directions of the best transmit beam of the MS 108 and the best receive beam of the ACM in the uplink. If a ranging message including the FMS code is received from the MS 108, the controller 809 sends a master switch confirm message for informing other member BSs and the MS 108 of its intention to operate as a new master BS, recognizing RLF between the MS 108 and the master BS 102. The master switch confirm message can include a temporary code and a master switch code. If the temporary code is included, the controller 809 determines that the ACM temporarily performs the function of the master BS. If the master switch code is included, the controller 809 determines that the ACM permanently performs the function of the master BS.

If the ACM performs the function of the master BS, the controller 809 sends a general MAP message for resource allocated to the MS 108, and controls to receive scheduled uplink data from the MS 108.

The method according to an embodiment of the present disclosure can be implemented with computer-readable codes in a computer-readable recording medium. The computer-readable recording medium includes all kinds of recording devices storing computer-readable data. Examples of the recording medium can include Read Only Memory (ROM), Random Access Memory (RAM), Compact Disk-Read Only Memory (CD-ROM), magnetic tape, floppy disc, optical data storage device, and the like, and can also include being implemented in the form of carrier waves (for example, transmission over the Internet).

As is apparent from the foregoing description, according to embodiments of the present disclosure, a ranging opportunity with an ACM or an alternative BS replacing a master BS (or a serving BS) is allocated to an MS using predetermined resources, making it possible to enable the ACM to play the role of the master BS if RLF between the MS and the master BS occurs.

Therefore, according to embodiments of the present disclosure, the seamless service delivery is possible not only in the communication environment where a switch of the master BS is predictable, but also in the wireless environment where the radio link state between the master BS and the MS fluctuates severely.

In addition, according to embodiments of the present disclosure, a switch of the master BS is possible in the system even with low overhead, and an ACM replacing the master BS can easily return the function of the master BS to the previous master BS.

Further, according to embodiments of the present disclosure, only the master BS and ACM among member BSs maintain uplink synchronization, so the MS can avoid the burden of the need to maintain the synchronization with all the member BSs in the cloud cell.

For example, although it is assumed in the above embodiments that ranging opportunities are allocated to the MS, allocating data transmission opportunities scheduled to the ACM can also be possible, instead of allocating the ranging opportunities.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communication method for a first base station (BS) in a wireless communication system, the method comprising:
establishing a radio link for communicating with a mobile station (MS);
receiving BS information from at least one second BS that cooperates with the first BS to communicate with the MS in a cell, the cell including the first BS and the at least one second BS, the cell being controlled by the first BS;
selecting an alternative BS from among the at least one second BS for switching the first BS to the alternative BS, based on the BS information;
transmitting information about the alternative BS to the at least one second BS and the MS; and
allocating a resource to be used for synchronization with the alternative BS to the MS; and
receiving, from the alternative BS, second information representing a switch of the first BS, if the alternative BS transmitting the second information to the first BS after receiving first information requesting the switch of the first BS from the MS,
wherein the first information is transmitted to the alternative BS by making the MS use the allocated resource, based on a state of the radio link between the first BS and the MS.

2. The communication method of claim 1, further comprising receiving a channel quality report from the MS,
wherein communication the selecting comprises selecting the alternative BS using the received channel quality report and the BS information.

3. The method of claim 1, wherein the BS information includes at least one of identification information, location information, load information and capability information about each of the at least one second BS.

4. The communication method of claim 1,
wherein the resource is a resource for a ranging opportunity for synchronization with the alternative BS.

5. The communication method of claim 4, wherein the ranging opportunity is allocated to the MS using a resource allocation message that is sent by the first BS.

6. A communication method for a second base station (BS) in a wireless communication system, the method comprising:
transmitting, to a first BS, BS information about the second BS, the first BS cooperating with at least one second BS including the second BS to communicate with a mobile station (MS) in a cell, the cell including the first BS and the at least one second BS, the cell being controlled by the first BS;
receiving, from the first BS, information about an alternative BS, the alternative BS being selected, by the first BS, based on the BS information from among the at least one second BS for switching the first BS to the alternative BS; and
transmitting, to the first BS and a mobile station (MS), second information representing a switch of the first BS, if the second BS is the alternative BS and receives, from the MS, first information requesting the switch of the first BS,
wherein the first information is received from the MS using a resource allocated to the MS for synchronization with the alternative BS, based on a state of a radio link between the first BS and the MS.

7. The communication method of claim 6, wherein the BS information includes at least one of identification information, location information, load information and capability information about the second BS.

8. The communication method of claim 6, wherein the first information is included in a ranging message for a ranging opportunity for synchronization with the alternative BS, and
wherein the first information includes first code information indicating the state of a radio link between the first BS and the MS.

9. The communication method of claim 8, wherein transmitting, to the first BS and the MS, a second information further comprises if the first code information indicates failure of the radio link between the first BS and the MS, transmitting, to the first BS and the MS, the second information representing the switch of the first BS.

10. The communication method of claim 9, wherein the second information includes second code information indicating whether the second BS operates as the first BS temporarily or permanently.

11. The communication method of claim 8, further comprising, if the second BS is the alternative BS and the first code information indicates that the state of the radio link of the first BS is a normal state, transmitting, to the first BS, beam information indicating directions of a transmit beam of the MS and a receive beam of the alternative BS, which have the highest signal strength.

12. A communication method for a mobile station (MS) in a wireless communication system, the method comprising:
establishing a radio link for communicating with a first base station (BS) that cooperates with at least one second BS in a cell, the cell including the first BS and the at least one second BS, the cell being controlled by the first BS;
receiving, from the first BS, information about an alternative BS selected from among the at least one second BS for switching the first BS to the alternative BS;
transmitting, to the alternative BS, first information requesting a switch of the first BS using a resource allocated by the first BS for synchronization with the alternative BS, based on a state of the radio link between the first BS and the MS; and
receiving, from the alternative BS, second information representing the switch of the first BS.

13. The communication method of claim 12, further comprising sending a channel quality report about the radio link to the first BS.

14. The communication method of claim 12, further comprising receiving, from the first BS, ranging opportunity allocation information for synchronization with the alternative BS.

15. The communication method of claim 14, wherein a ranging opportunity for synchronization with the alternative BS is allocated to the MS using a resource allocation message that is sent by the first BS.

16. The communication method of claim 14, wherein the transmitting further comprises transmitting, to the alternative BS, the first information requesting the switch of the first BS, based on the ranging opportunity allocated by the first BS,
wherein the first information includes code information indicating the state of a radio link between the first BS and the MS.

17. The communication method of claim 16, further comprising, after transmitting the first information including the code information indicating the state of the radio link, receiving a resource allocation message from the alternative BS and performing data transmission.

18. A first base station (BS) in a wireless communication system, the first BS comprising:
a transceiver configured to transmit or receive a signal in a wireless network;
a communication interface configured to communicate with at least one other BS; and
a controller configured to control to:
establish a radio link for communicating with a mobile station (MS),
receive BS information from at least one second BS that cooperates with the first BS to communicate with the MS in a cell, the cell including the first BS and the at least one second BS, the cell being controlled by the first BS,
select an alternative BS from among the at least one second BS for switching the first BS to the alternative BS, based on the BS information,
transmit information about the alternative BS to the at least one second BS and the MS,
allocate a resource to be used for synchronization with the alternative BS to the MS, and
receive, from the alternative BS, second information representing a switch of the first BS, if the alternative BS transmitting the second information to the first BS after receiving first information requesting the switch of the first BS from the MS,
wherein the first information is transmitted to the alternative BS by the MS using the allocated resource, based on a state of the radio link between the first BS and the MS.

19. The first BS of claim 18, wherein the controller is further configured to control to receive a channel quality report from the MS, and to select the alternative BS using the received channel quality report and the BS information.

20. The first BS of claim 18, wherein the BS information includes at least one of identification information, location information, load information and capability information about each of the at least one second BS.

21. The first BS of claim 18,
wherein the controller is further configured to allocate a ranging opportunity for synchronization with the alternative BS to the MS.

22. The first BS of claim 21, wherein the ranging opportunity is allocated to the MS using a resource allocation message that is sent by the first BS.

23. A second base station (BS) in a wireless communication system, the second BS comprising:
a transceiver configured to transmit or receive a signal in a wireless network;
a communication interface configured to communicate with at least one other BS; and
a controller configured to control to:
transmit, a first BS., BS information for selecting an alternative BS about the second BS the first BS cooperating with at least one second BS including the second BS to communicate with a mobile station (MS) in a cell, the cell including the first BS and the at least one second BS, the cell being controlled by the first BS, receive, from the first BS, information about the alternative BS from the first BS, the alternative BS being selected, by the first BS, based on the BS information from among the at least one second BS for switching the first BS to the alternative BS, and transmit, to the first BS and a mobile station (MS), second information representing a switch of the first BS, if the second BS is the alternative BS and receives, from the MS, first information requesting the switch of the first BS, wherein the first information is received from the MS using a resource allocated to the MS for synchronization with the alternative BS, based on a state of a radio link between the first BS and the MS.

24. The second BS of claim 23, wherein the BS information includes at least one of identification information, location information, load information and capability information about the second BS.

25. The second BS of claim 23, wherein the first information is included in a ranging message for a ranging opportunity for synchronization with the alternative BS, the controller is further configured to checker the first information included in the ranging message, the first information including the first code information indicating the state of a radio link between the first BS and the MS.

26. The second BS of claim 25, wherein if the first code information indicates failure of the radio link between the first BS and the MS, the controller is further configured to control to transmit, to the first BS and the MS, the second information representing the switch of the first BS.

27. The second BS of claim 26, wherein the second information includes second code information indicating whether the second BS operates as the first BS temporarily or permanently.

28. The second BS of claim 25, wherein if the second BS is the alternative BS and the first code information indicates that the state of the radio link of the first BS is a normal state, the controller is further configured to control to transmit, to the first BS, beam information indicating directions of a transmit beam of the MS and a receive beam of the alternative BS, which have the highest signal strength.

29. A mobile station (MS) in a wireless communication system, the MS comprising:
a transceiver configured to transmit or receive a signal in a wireless network; and
a controller configured to control to:
establish a radio link for communicating with a first base station (BS) that cooperation cooperates with at least one second BS in a cell, the cell including the first BS and the at least one second BS, the cell being controlled by the first BS,
receive information about an alternative BS selected from among the at least one second BS for switching the first BS to the alternative BS,
transmit, to the alternative BS, first information requesting a switch of the first BS using a resource allocated by the first BS for synchronization with the alternative BS, based on radio link between the first BS and the MS, and
receive, from the alternative BS, second information representing the switch of the first BS.

30. The MS of claim 29, wherein the controller is further configured to control to send a channel quality report about the radio link to the first BS.

31. The MS of claim 29, wherein the controller controls to receive from the first BS, ranging opportunity allocation information for synchronization with the alternative BS and to transmit, to the alternative BS., the first message based on the ranging opportunity allocation information.

32. The MS of claim 31, wherein a ranging opportunity for synchronization with the alternative BS is allocated to the MS using a resource allocation message that is sent by the first BS.

33. The MS of claim 31, wherein the controller is further configured to control to transmit, to the alternative BS, the first information requesting the switch of the first BS, based on the ranging opportunity allocated by the first BS, and the first information includes code information indicating the state of a radio link between the first BS and the MS.

34. The MS of claim 33, wherein after sending the first information including code information indicating the state of the radio link, the controller is further configured to control to receive a resource allocation message from the alternative BS and perform data transmission.

* * * * *

UNITED STATES PATENT AND TRADEMARK OFFICE
CERTIFICATE OF CORRECTION

PATENT NO. : 9,538,437 B2
APPLICATION NO. : 13/769093
DATED : January 3, 2017
INVENTOR(S) : Rakesh Taori et al.

It is certified that error appears in the above-identified patent and that said Letters Patent is hereby corrected as shown below:

In the Claims

Column 14, Claim 1, Line 29, delete "BS, if the" and insert --BS, the--.

Column 14, Claim 2, Line 39, delete "wherein communicating the" and insert --wherein the--.

Column 14, Claim 3, Line 42, delete "The method" and insert --The communication method--.

Column 14, Claim 6, Line 57, delete "second BS including the second BS to" and insert --second BS to--.

Column 16, Claim 18, Line 34, delete "BS, if the" and insert --BS, the--.

Column 17, Claim 25, Line 25, delete "to checker the" and insert --to check the--.

Column 18, Claim 29, Line 7, delete "that cooperation cooperates" and insert --that cooperates--.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*